United States Patent [19]

Hardt

[11] 4,096,018

[45] Jun. 20, 1978

[54] LAMINATOR ASSEMBLY

[75] Inventor: David R. Hardt, East Greenwich, R.I.

[73] Assignee: Sheldahl, Inc., Northfield, Minn.

[21] Appl. No.: 832,402

[22] Filed: Sep. 12, 1977

Related U.S. Application Data

[63] Continuation of Ser. No. 644,516, Dec. 29, 1975, abandoned.

[51] Int. Cl.[2] .......................... B05C 9/14; B32B 35/00

[52] U.S. Cl. ...................................... 156/381; 34/157; 34/205; 118/67; 118/224; 156/499; 156/549; 156/555; 156/578

[58] Field of Search ............... 156/381, 499, 549, 551, 156/555, 578, 182, 554, 543; 34/153, 154, 157, 159, 203, 205; 118/642, DIG. 7, 58, 67, 68, 224

[56] References Cited

U.S. PATENT DOCUMENTS

| | | | |
|---|---|---|---|
| 130,133 | 8/1872 | Jenkins | 34/159 |
| 1,837,682 | 12/1931 | Searight | 118/67 |
| 1,989,455 | 1/1935 | Loomis | 118/68 |
| 2,128,739 | 8/1938 | Connor | 156/381 |
| 2,629,424 | 2/1953 | Stegemann | 156/381 |
| 2,993,523 | 7/1961 | Monaco et al. | 156/381 |
| 3,086,904 | 4/1963 | Uhleen | 156/549 |

*Primary Examiner*—David Klein
*Assistant Examiner*—M. G. Wityshyn
*Attorney, Agent, or Firm*—Orrin M. Haugen

[57] ABSTRACT

A laminator system for the continuous treatment and lamination of a plurality of flexible webs, with the system including the conventional adhesive applicator stations and laminator stations, with a drying chamber being arranged to dry or otherwise condition the applied adhesive films. The drying chamber is an annular enclosure having a generally inverted "U" configuration with access openings being formed at the base of each of the upright legs. Guide rolls are provided for creating a plurality of web paths through the laminator system, with the web paths including a plurality of generally parallel and concentric spans extending through the drying chamber. In addition to size reduction considerations, the drying chamber provides enhanced versatility for the laminator assembly, and simplifies solvent recovery.

3 Claims, 3 Drawing Figures

LAMINATOR ASSEMBLY

This is a continuation of application Ser. No. 644,516 filed Dec. 29, 1975, now abandoned.

BACKGROUND OF THE INVENTION

The present invention relates generally to a laminator assembly, and more specifically to a laminator system arranged for the continuous treatment of a plurality of flexible webs, such as polyethylene film or the like. In addition to the conventional adhesive application stations and laminator stations, the apparatus includes a drying chamber having the configuration of an inverted "U", and being provided with guide rolls for the simultaneous movement of multiple spans of the web being treated.

In the design of laminator assemblies, particularly laminator assemblies which will be utilized for a variety of fabrication applications, versatility and interchangeability are desirable features. In addition, a reduction in the number of web leads and lead lengths are desirable objectives. The laminator system of the present invention provides these desirable characteristics along with an arrangement for efficient recovery of solvent from the system.

SUMMARY OF THE INVENTION

Briefly, in accordance with the present invention, a laminator system is provided which includes a plurality of unwind stands, and an arrangement of guides which moves the web from an adhesive applicator station through the drying chamber, and thence on to a laminator station. Upon leaving the first laminator station, the composite partially completed web is passed through a second adhesive applicator station, and then re-passed through the drying chamber in a direction counter-current to the initial path. Upon emerging from the drying chamber, the composite web having a conditioned adhesive film on a surface is then joined with a third film, and thereafter again passed through the drying chamber in a path parallel to the initial path and in the same direction. Upon emerging from the drying chamber, the composite web may be further treated by the addition of still another web, or alternately the application of a thermalstrip or the like thereon.

The apparatus of the present invention is particularly adapted for use in the preparation of multi-layered laminates or webs which find utility in the fabrication of multi-wall bags or the like. It is appreciated, of course, that laminates, particularly those prepared from webs of flexible film find utility in a wide variety of applications.

Therefore, it is a primary object of the present invention to provide an improved laminator assembly which is highly versatile, and adapted for multiple applications, and which is capable of continuously accommodating a substantial number of individual webs.

It is yet a further object of the present invention to provide an improved laminator system for the continuous treatment of a plurality of individual webs, the laminator system utilizing a single drying chamber which simultaneously accommodates a plurality of spans of composite web materials.

It is yet a further object of the present invention to provide an improved laminator system which reduces the number of web leads required, and in addition shortens the length of the individual leads.

Other and further objects of the present invention will become apparent to those skilled in the art upon a study of the following specifications, appended claims, and accompanying drawings.

DESCRIPTION OF THE PREFERRED EMBODIMENT

Figures 1, 2:
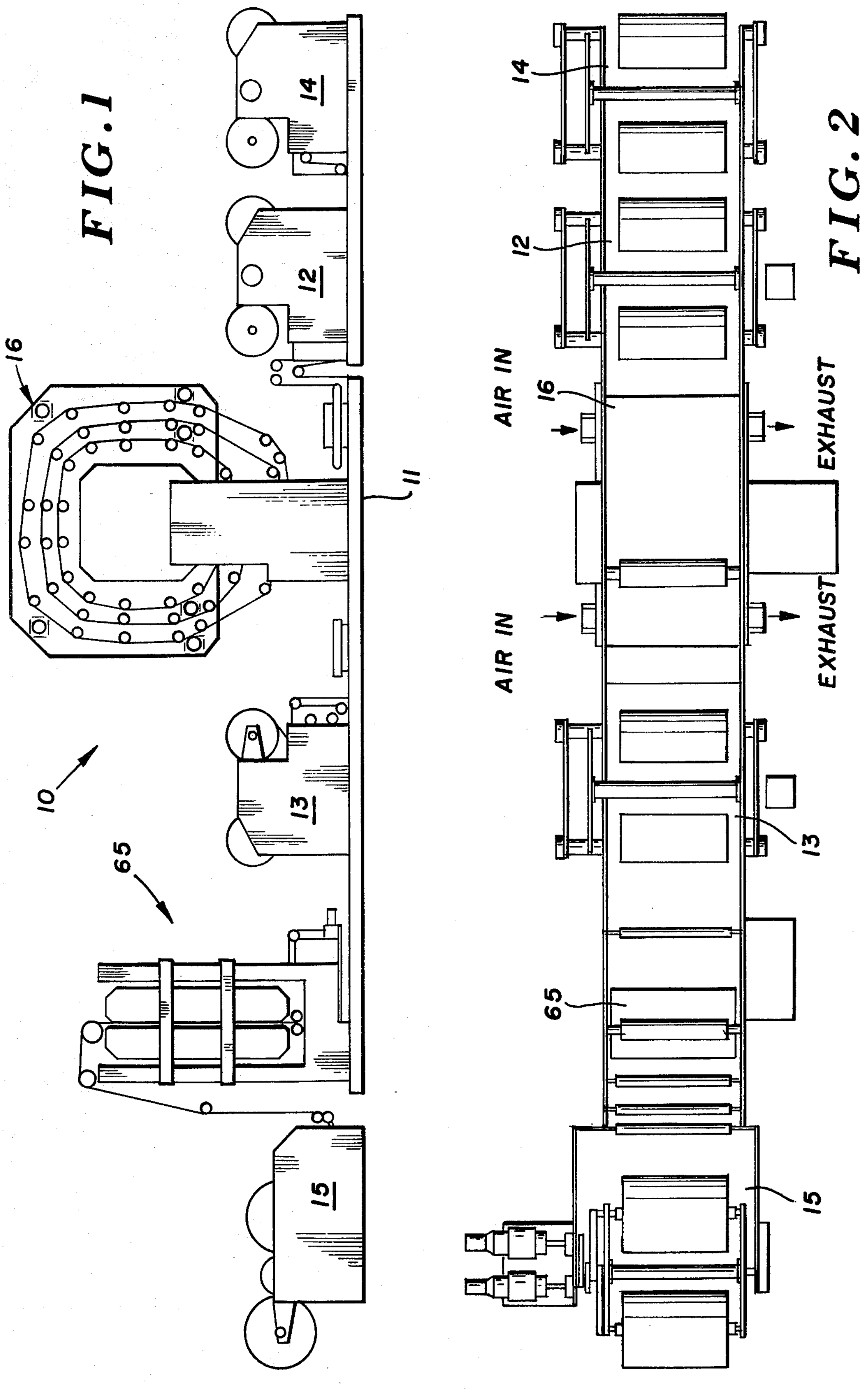
FIG. 1 is a side elevational view of a typical laminator assembly prepared in accordance with the present invention, with a portion of the drying chamber being cut away so as to illustrate the details thereof.
FIG. 2 is a top plan view of the laminator assembly illustrated in FIG. 1, with a portion of the drying chamber being cut away so as to illustrate the other features of the system.
Figure 3:
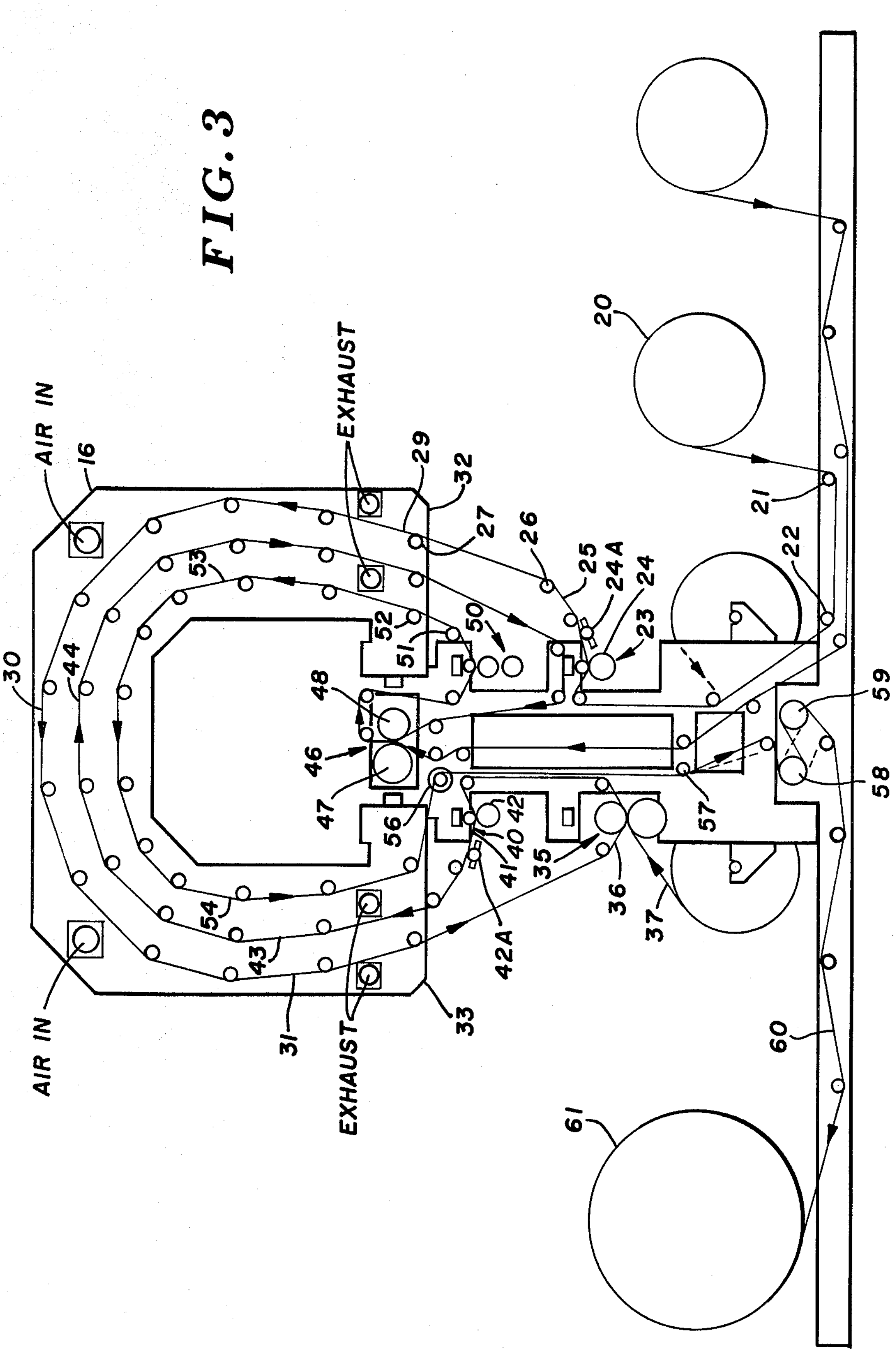
FIG. 3 is a detail side elevational view of the drying chamber prepared in accordance with the present invention.

In accordance with the preferred embodiment of the present invention, and with attention being directed to FIG. 1, the laminator assembly generally designated 10 includes base frame means 11 upon which are mounted a primary unwind stand 12, a secondary unwind stand 13, a tertiary unwind stand 14, and a rewinder or take-up stand 15. Disposed between the primary and secondary unwind stands 12 and 13 respectively are a plurality of adhesive applicator or coating stations, along with laminator stations, together with a drying chamber generally designated 16. As is apparent in FIG. 1, a plurality of guide means and the like are provided in order to define a path through which the various webs and composites thereof may be passed.

In order to follow the progress of the individual webs through the apparatus, material from the primary unwind stand 12 is taken from roll 20, and carried through guide rolls 21 and 22, as well as others, to the first applicator station such as the station generally designated 23. Applicator station 23 includes a film applying roller 24 and a leveling roller 24A which together function as a conventional roller coater applying a level or uniform film of adhesive to the surface of the web as at 25. The web is then carried by additional guide rolls such as, for example, guide rolls 26, 27, and others, wherein the web travels along a first plurality of spans such as the spans 29, 30 and 31, among others, thereby passing entirely through the confines of drying chamber 16, having entered chamber 16 through a first access opening 32, and emerging through second access opening 33. The web then passes from the drying chamber 16 to the nip of a first laminating station generally designated 35 where the conditioned web surface such as at 36 meets the web being delivered to the system from the secondary unwind stand 13, such as web 37. Laminator station 35 is a conventional laminator station and provides the force and other conditions necessary for bonding the webs together to form a composite web. Upon leaving laminator station 35, the composite web passes through the second coating station generally designated 40 whereupon surface 41 of the web is coated from roller coater 42 and level roller 42A, the web then continuing through a plurality of spans such as at 43 and 44, in a counter-current direction from that of the first pass, until ultimately emerging from the dryer 16 and passing through the second laminating station generally designated 46. Laminating station 46 includes rollers 47 and 48 which provide the force and other conditions necessary for joining the composite web with material from the tertiary unwind stand 14.

Upon departing laminator station 46, composite web may either be passed directly through drying chamber 16 for a third pass, or may be provided with a heat sealing coat or thermal-strip at applicator station generally designated 50. Such thermal-strips are, of course, commonly applied to laminates and will be arranged in a pattern such as that indicated by the ultimate end use of the material. The then treated material passes over guides 51 and 52, among others, through spans such as spans 53 and 54 until being discharged from the drying chamber 16 through access opening 33, over guide rolls 56 and 57, and ultimately on to the pair of chill-rolls as at 58 and 59. Chill-rolls 58 and 59 are arranged in a flip-flop disposition depending upon the requirements of the product as it passes through the chill-roll area. Upon departing the chill-rolls 58 and 59, web such as at 60 is taken up on rewind stand 15 in the form of roll 61.

Applicator Stations

It will be appreciated that the coating or applicator stations may be any of the commercially available conventional varieties, including the following for example:

gravure
offset gravure
kiss coating
reverse roll coating
smoothing bar coating
mixer rod coating Thus, the coating system is not critical, but is one which is adpated for use in connection with the materials being treated.

In certain applications, it is desirable to utilize a stripper for web treatment, and in the embodiment illustrated, such a stripper is shown as at 65. This station may be utilized, for example, for applying thermal strip which strip did not require extensive drying subsequent to application.

Unwind Stands

The unwind stands which are illustrated are also of the commercial variety, and are equipped with means for retaining a pair of supply rolls so as to accommodate changing of the rolls on a continuous and running basis. Such unwind stands are, of course, commercially available and recognized and utilized in the art with one such stand being shown in U.S. Pat. No. 2,990,989.

Laminator Stations

Normally, a conventional laminator station may be utilized, including a pair of heated rolls forming a nip through which the materials to be joined pass. Adequate force is applied to accommodate the laminating operation. Laminating rollers of this type are, of course, commercially available.

The Drying Chamber

As has been indicated, the drying chamber 16 is one having an inverted "U" configuration with a pair of upright legs being coupled together with a cross-member at the top thereof. The drying chamber is provided with a plurality of guide rolls which move the web through the chamber on multiple passes, with the paths generated by the guide rolls for the web being generally parallel, one to another, and concentric. The drying chamber is provided with air inlet and exhaust ports to accommodate a flow of air for conditioning the adhesive film so as to provide for subsequent bonding of the film. The drying chamber normally provides a solvent removal operation for solvent-based adhesive films and the inlet air may be heated, if desired to accelerate the solvent removal. In the case of the thermal-strip, the drying chamber is used to addtionally condition the strip through exposure to heat, and ultimate solvent removal.

I claim:

1. In a laminator system for the continuous treatment and lamination of a plurality of flexible webs, the system including a plurality of unwind stands for retaining and accommodating delivery of individual supplies of said webs to said laminator system, each unwind stand being adapted for the continuous delivery of a web into said laminator system, and rewind means for receiving a finished laminate from said laminator system, applicator stations for applying a film of fluid adhesive to selected portions of said web surfaces, drying chamber means arranged to receive coated webs from said applicator stations for conditioning said adhesive film to form a conditioned web, and laminator stations for bonding the surface of said conditioned webs to a second web surface; said laminator system being characterized in that:

(a) said drying chamber being an annular enclosure having a generally inverted "U" configuration and including a pair of generally upright legs coupled together with an enclosed cross-member extending across the top thereof, each of said legs and said cross-member having a front and a back secured thereto to complete the enclosure, said cross-member being in communication with each of said legs, at opposed ends thereof, and with mutually adjacent first and second web access openings being formed at the base of each of said legs;

(b) means for carrying said webs along a predetermined path alternately through adhesive applicator stations and laminator stations for forming composite webs, and including means for carrying adhesive bearing webs from said applicator stations through said drying chamber;

(c) guide rolls for creating a web path including a plurality of generally parallel and concentric web spans extending through said drying chamber and including a first series of guide rolls for carrying a web along a first plurality of spans extending through a first applicator station adjacent said first access opening of said drying chamber for application of a film of solvent-bearing adhesive to a first surface of said web, thence through said drying chamber to a first laminator station diposed adjacent said second access opening of said drying chamber to form a first compositve web, and with said first series of guide rolls carrying said first composite web through a second adhesive applicator station adjacent said first laminator station for coating a portion of one surface of the web received from said first laminator station;

(d) a second series of guide rolls for carrying said coated composite web from said second adhesive applicator station adjacent said second access opening through said drying chamber and along a second plurality of spans spaced from and generally parallel to said first plurality of spans through said drying chamber into a second laminator station disposed adjacent said first access opening to form a second composite web, and with said second series of guide rolls carrying said second composite web through a third adhesive applicator station adjacent said second laminator station for coating a portion of one surface of the web received from said second laminator station;

(e) a third series of guide rolls for carrying said coated second composite web from said third adhesive applicator station adjacent said first access opening through said drying chamber and along a third plurality of spans spaced from and generally parallel to said first plurality of spans through said drying chamber into a third laminator station disposed adjacent said second access opening to form a third composite web; and (f) a fourth series of guide rolls for carrying said third composite web to said rewind station, each guide roll of each series of guide rolls being disposed to contact that surface of the web which is opposed to the web surface to which the film of adhesive has been applied.

2. The laminator system as defined in claim 1 being particularly characterized in that said unwind stands are equipped with means for retaining multiple supply rolls.

3. The laminator system as defined in claim 1 being particularly characterized in that air inlet and exhaust ports are provided for said drying chamber, said inlet ports being disposed along said cross-member, and with exhaust ports being formed adjacent the base of each of said legs in opposed relationship to said air inlet ports.

* * * * *